US009661100B2

(12) United States Patent
Rao et al.

(10) Patent No.: US 9,661,100 B2
(45) Date of Patent: May 23, 2017

(54) PODCASTS IN PERSONALIZED CONTENT STREAMS

(71) Applicant: Yahoo! Inc., Sunnyvale, CA (US)

(72) Inventors: Supreeth Rao, Sunnyvale, CA (US); Sundeep Narravula, Sunnyvale, CA (US); Shivakumar Ningappa, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 306 days.

(21) Appl. No.: 14/320,620

(22) Filed: Jun. 30, 2014

(65) Prior Publication Data
US 2015/0381682 A1 Dec. 31, 2015

(51) Int. Cl.
G06F 15/16 (2006.01)
H04L 29/08 (2006.01)
G06F 17/30 (2006.01)
H04N 21/25 (2011.01)
H04N 21/258 (2011.01)
H04N 21/2668 (2011.01)
H04N 21/81 (2011.01)
H04N 21/8352 (2011.01)
H04N 21/858 (2011.01)

(52) U.S. Cl.
CPC ........ H04L 67/32 (2013.01); G06F 17/30893 (2013.01); H04N 21/251 (2013.01); H04N 21/25891 (2013.01); H04N 21/2668 (2013.01); H04N 21/812 (2013.01); H04N 21/8352 (2013.01); H04N 21/8586 (2013.01)

(58) Field of Classification Search
CPC ... H04L 65/60; H04L 67/32; G06F 17/30864; G06F 17/30893; H04N 21/251; H04N 21/25891; H04N 21/2668; H04N 21/872; H04N 21/8352; H04N 21/8586
See application file for complete search history.

(56) References Cited

U.S. PATENT DOCUMENTS

2008/0077574 A1* 3/2008 Gross ................ G06F 17/30699
2008/0187112 A1* 8/2008 Koberstein ............. H04L 67/26
379/88.17
2009/0254499 A1* 10/2009 Deyo ..................... G06Q 10/10
706/12

FOREIGN PATENT DOCUMENTS

WO WO 2014146265 A1 * 9/2014 ......... G06Q 30/0631

* cited by examiner

Primary Examiner — June Sison
Assistant Examiner — Steven Nguyen
(74) Attorney, Agent, or Firm — Martine Penilla Group, LLP

(57) ABSTRACT

Software on a content-aggregation website obtains a resource associated with a podcast from a website publishing the podcast and stores it e resource on the content-aggregation website. The software adds the resource as a leaf node to a taxonomy generated by the content-aggregation website. The addition is based on data associated with the podcast. The non-leaf nodes in the taxonomy are categories of content. The software determines that a user of the content-aggregation website is qualified as to at least one category that includes the resource as a leaf node. The determination is based at least in part on feedback from the user that includes a viewing or listening history for the user. Then the software serves the resource to the user in a content stream published by the content-aggregation website, based at least in part on a personalization score associated with the resource.

20 Claims, 9 Drawing Sheets

PODCASTS IN PERSONALIZED CONTENT STREAMS

BACKGROUND

Podcasts usually consist of audio, video, PDF, and/or ePub files that are published or broadcast online in a series of episodes. They can be downloaded using software known as a podcatcher and played or streamed by a media player. Though many podcasts are paid for using a subscription, many are also accessible for free. Often a user accesses a podcast through a web-feed link on a "wall" webpage (e.g., MyYahoo!) associated with a user.

Facebook, Twitter, Google+, and other social networking websites present items of content including text, images, and videos to their users using a content stream that is in reverse-chronological order (e.g., with the topmost item in the stream being the last in time) or ordered according to an interestingness algorithm (e.g. with the topmost item in the stream having the highest interestingness score according to the algorithm) and/or a personalization algorithm. Such content streams are now also used by content-aggregation websites such as Yahoo! News and Google News.

SUMMARY

In an example embodiment, a processor-executed method is described. According to the method, software running on servers at a content-aggregation website obtains a resource associated with a podcast from a website publishing the podcast and stores the resource on the content-aggregation website. The software adds the resource as a leaf node to a taxonomy generated by the content-aggregation website. The addition is based at least in part on data associated with the podcast. The non-leaf n des in the taxonomy are categories of content. The software determines that a user of the content-aggregation website is qualified as to at least one category that includes the resource as a leaf node. The determination is based at least in part on feedback from the user that includes a viewing or listening history for the user. Then the software serves the resource to the user in a content stream published by the content-aggregation website, based at least in part on a personalization score associated with the resource.

In another example embodiment, an apparatus is described, namely, computer-readable media which persistently store a program that runs on a content-aggregation website. The program obtains a resource associated with a podcast from a website publishing the podcast and stores the resource on the content-aggregation website. The program adds the resource as a leaf node to a taxonomy generated by the content-aggregation website. The addition is based at least in part on data associated with the podcast. The non-leaf nodes in the taxonomy are categories of content. The program determines that a user of the content-aggregation website is qualified as to at least one category that includes the resource as a leaf node. The determination is based at least in part on feedback from the user that includes a viewing or listening history for the user. Then the program serves the resource to the user in a content stream published by the content-aggregation website, based at least n part on a personalization score associated with the resource.

Another example embodiment also involves a processor-executed method. According to the method, software running on servers at a content-aggregation website obtains a resource associated with a podcast from a website publishing the podcast and stores the resource on the conntnet-aggregation website. The software adds the resource as a leaf node to a taxonomy generated by the content-aggregation website. The addition is based at least in part on data associated with the podcast. The non-leaf nodes in the taxonomy are categories of content. The taxonomy can be represented as a B+ tree and is generated by it e content-aggregation website using supervised classifiers. The software determines that a user of the content-aggregation website is qualified as to at least one category that includes the resource as a leaf node. The determination is based at least in part on feedback from the user that includes a viewing or listening history for the user. Then the software serves the resource to the user in a content stream published by the content-aggregation website, based at least in part on a personalization score associated with the resource.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an example embodiment" as used herein does not necessarily refer to the same embodiment and the phrase "in another example embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
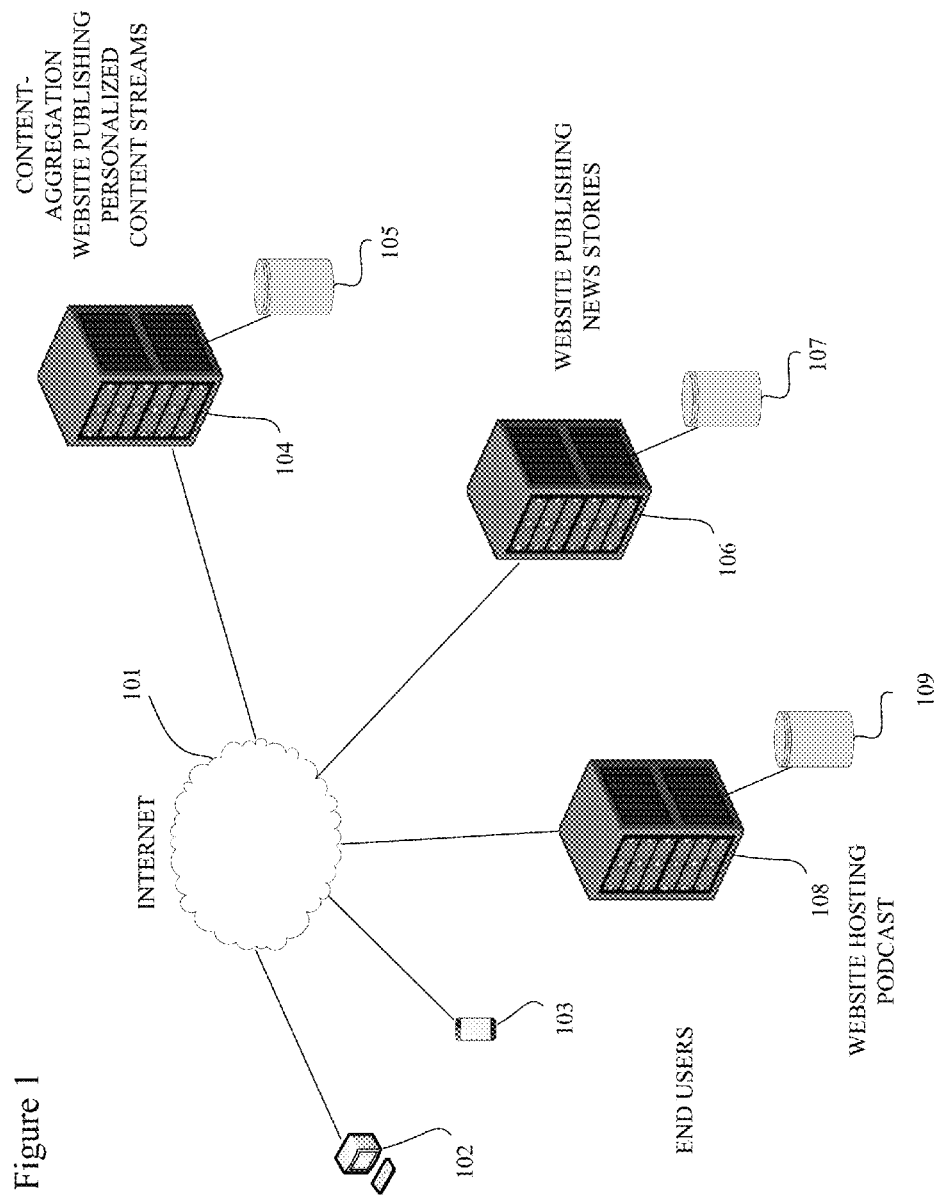
FIG. 1 is a network diagram showing a website hosting a podcast and a content-aggregation website, in accordance with an example embodiment.

FIG. 1 is a network diagram showing a website hosting a podcast and a website content-aggregation website, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which might be wireless in part or in whole) with a content-aggregation website 104 publishing personalized content streams, a website 106 publishing news stories/articles (e.g., the website for the New York Times), and a website 108 hosting a podcast, as described in further detail below. In an example embodiment, website 104 might be a website such as Yahoo! News or Google News, which ingests content from the Internet through "push" technology (e.g., a subscription to a web feed such as an RSS feed) and/or "pull" technology (e.g., web crawling), including stories (or Uniform Resource Locators (URLs) for stories) from website 106 and a podcast (or URLs for a podcast) from website 108.

In an example embodiment, website 104 might be an online social network such as Facebook or Twitter. As used here and elsewhere in this disclosure, the term "online social network" is to be broadly interpreted to include, for example, any online service, including a social-media service, that allows its users to, among other things, (a) selectively access (e.g., according to a friend list, contact list, buddy list, social graph, interest graph, or other control list) content (e.g., text including web links, images, videos, animations, audio recordings, games and other software, etc.) associated with each other's profiles (e.g., Facebook walls, Flickr photo albums, Pinterest boards, etc.); (b) selectively (e.g., according to a friend list, contact list, buddy list, social graph, interest graph, distribution list, or other control list) broadcast content (e.g., text including web links, images, videos, animations, audio recordings, games and other software, etc.) to each other's newsfeeds (e.g., content/activity streams such as Facebook's News Feed, Twitter's Timeline, Google+'s Stream, etc.); and/or (c) selectively communicate (e.g., according to a friend list, contact list, buddy list, social graph, interest graph, distribution list, or other control list) with each other (e.g., using a messaging protocol such as email, instant messaging, short message service (SMS), etc.).

And as used in this disclosure, the term "content aggregation" is to be broadly interpreted to include any online service, including a social-media service, that allows its users to, among other things, access and/or annotate (e.g., comment on) content (e.g., text including web links, images, videos, animations, audio recordings, games and other software, etc.) aggregated/ingested by the online service (e.g., using its own curators and/or its own algorithms) and/or its users and presented in a "wall" view or "stream" view. It will be appreciated that a website hosting online content aggregation might have social features based on a friend list, contact list, buddy list, social graph, interest graph, distribution list, or other control list that is accessed over the network from a social-networking website through an application programming interface (API) exposed by the social-networking website. For example, Yahoo! News might identify the content items in its newsfeed (e.g., as displayed on the front page of Yahoo! News) that have been viewed/read by a user's friends, as listed on a Facebook friend list that the user has authorized Yahoo! News to access.

In an example embodiment, websites 104, 106, and 108 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Pig, Hive, Dremel, CloudBase, etc. The servers in website 104 might be connected to persistent storage 105, the servers in website 106 might be connected to persistent storage 107, and the servers at website 108 might be connect to persistent storage 109. Persistent storages 105, 107, and 109 might include flash memory, a redundant array of independent disks (RAID), and/or a storage area network (SAN), in an example embodiment. In an alternative example embodiment, the servers for websites 104, 106, and 108 and/or the persistent storage in persistent storages 105, 107, and 109 might be hosted wholly or partially in a public and/or private cloud, e.g., where the cloud resources serve as a platform-as-a-service (PaaS) or an infrastructure-as-a-service (IaaS).

Persistent storages 105, 107, and 109 might be used to content (e.g., text including web links, images, videos, animations, audio recordings, games and other software, etc.) and/or its related data. Additionally, persistent storage 105 might be used to store data related to users and their social contacts (e.g., Facebook friends), as well as software including algorithms and other processes for presenting the content to the users in a personalized stream which might be ordered from top to bottom (a) in reverse chronology (e.g., latest in time on top), or (b) according to personalization scores as described in further detail below. In an example embodiment, some of the content (and/or its related data) stored in persistent storages 105, 107, and 109 might have been received from a content delivery or distribution network (CDN), e.g., Akami Technologies. Or, alternatively, some of the content (and/or its related data) might be delivered directly from the CDN to the personal computer 102 or the mobile device 103, without being stored in persistent storages 105, 107, and 109.

Personal computer 102 and the servers at websites 104, 106, and 108 might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family or the x86 family), volatile storage (e.g., RAM), and persistent storage (e.g., flash memory such as microSD), (2) an operating system (e.g., iOS, webOS, Windows Mobile, Android, Linux, Symbian OS, RIM BlackBerry OS, etc.) that runs on the hardware, and (3) one or more accelerometers, one or more gyroscopes, global positioning system (GPS) or other location-identifying type capability.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers to access content presented by websites 104, 106, and 108. Alternatively, users of personal computer 102 and/or mobile device 103 might use application programs (or apps, including hybrid apps that display HTML content) to access content presented by websites 104, 106, and 108.

Figure 2A:
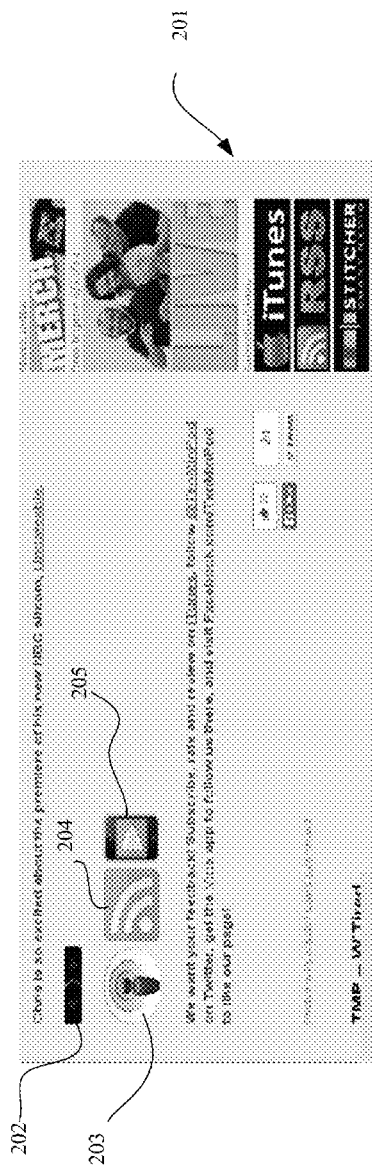
FIG. 2A is a webpage for an audio podcast, in accordance with an example embodiment.
Figure 2B:
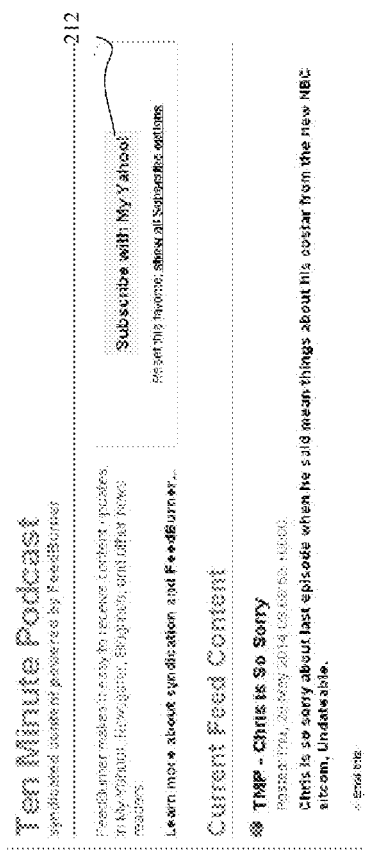
FIG. 2B is a webpage for a web-feed management provider, in accordance with an example embodiment.

FIG. 2A is a webpage for an audio podcast, in accordance with an example embodiment. In an example embodiment, webpage 201 might be served by a podcast-hosting service, e.g., Libysyn. The webpage 201 includes various controls and widgets such as controls 202, 203, 204, and 205. Control 202 controls a Flash media player that executes instructions (e.g., written in ActionScript) on a user's client device (e.g., personal computer 102 or mobile device 103) to stream the audio podcast. Control 205 controls a non-Flash media player that streams the audio podcast on mobile devices such as mobile device 103. Control 203 links to an iTunes website where the audio podcast can be downloaded as an audio file or streamed to an iTunes media player that executes on a user's client device (e.g., personal computer 102 or mobile device 103). And control 204 links to webpage for a web-feed management provider named FeedBurner which allows a user to subscribe to the audio podcast, e.g., by adding it to the user's MyYahoo! webpage (which historically has been a personalized "wall" view, as opposed to a personalized "stream" view), as shown by control 212 in webpage 211 in FIG. 2B.

Figure 2C:
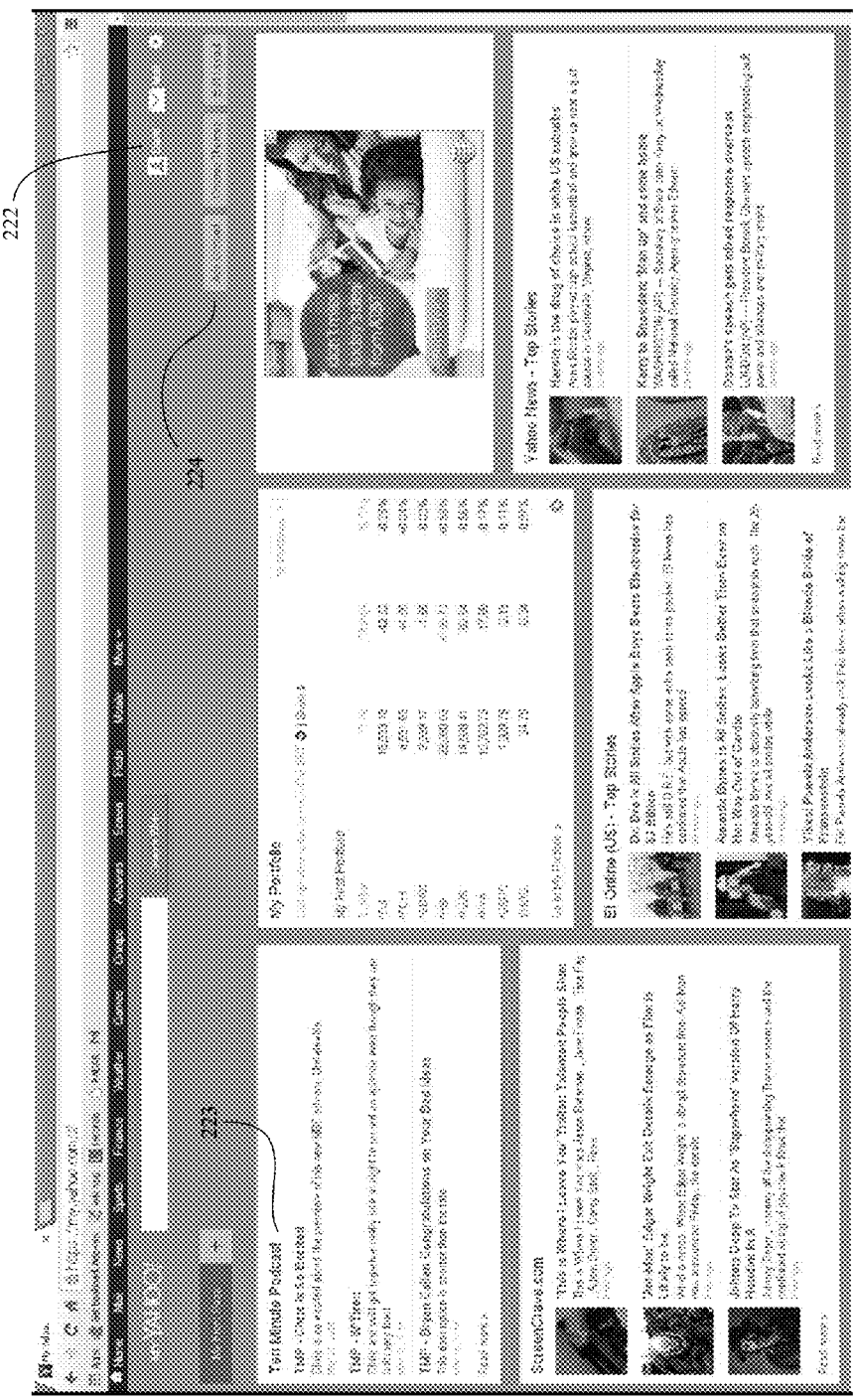
FIG. 2C is a "wall" webpage for a content-aggregation website that supports user subscriptions to podcasts.

FIG. 2C is a webpage for a content-aggregation website that supports user subscriptions to podcasts. Webpage 221 is a MyYahoo! webpage, which presents a "wall" view that is personalized by explicit relevance feedback (e.g., through commands received by controls in a graphical user interface (GUI)) from a user 222 (e.g., as identified through login authentication). Webpage 221 includes a view 223 based on an RSS file which is written in eXtensible Markup Language (XML) that pulls individual podcasts from the website publishing the podcast (e.g., website 108) and adds hypertext links to them to webpage 221. If a user clicks on one of the hypertext links, a non-Flash media player will launch and stream the individual podcast associated with the clicked-on hypertext link. Webpage 221 also includes a control 224 that allows a user to add a podcast to webpage 221 using the URL for the podcast's web-feed (e.g., HTTP://FINANCE.YAHOO.COM/NEWS/?FORMAT=RSS).

Figure 3:
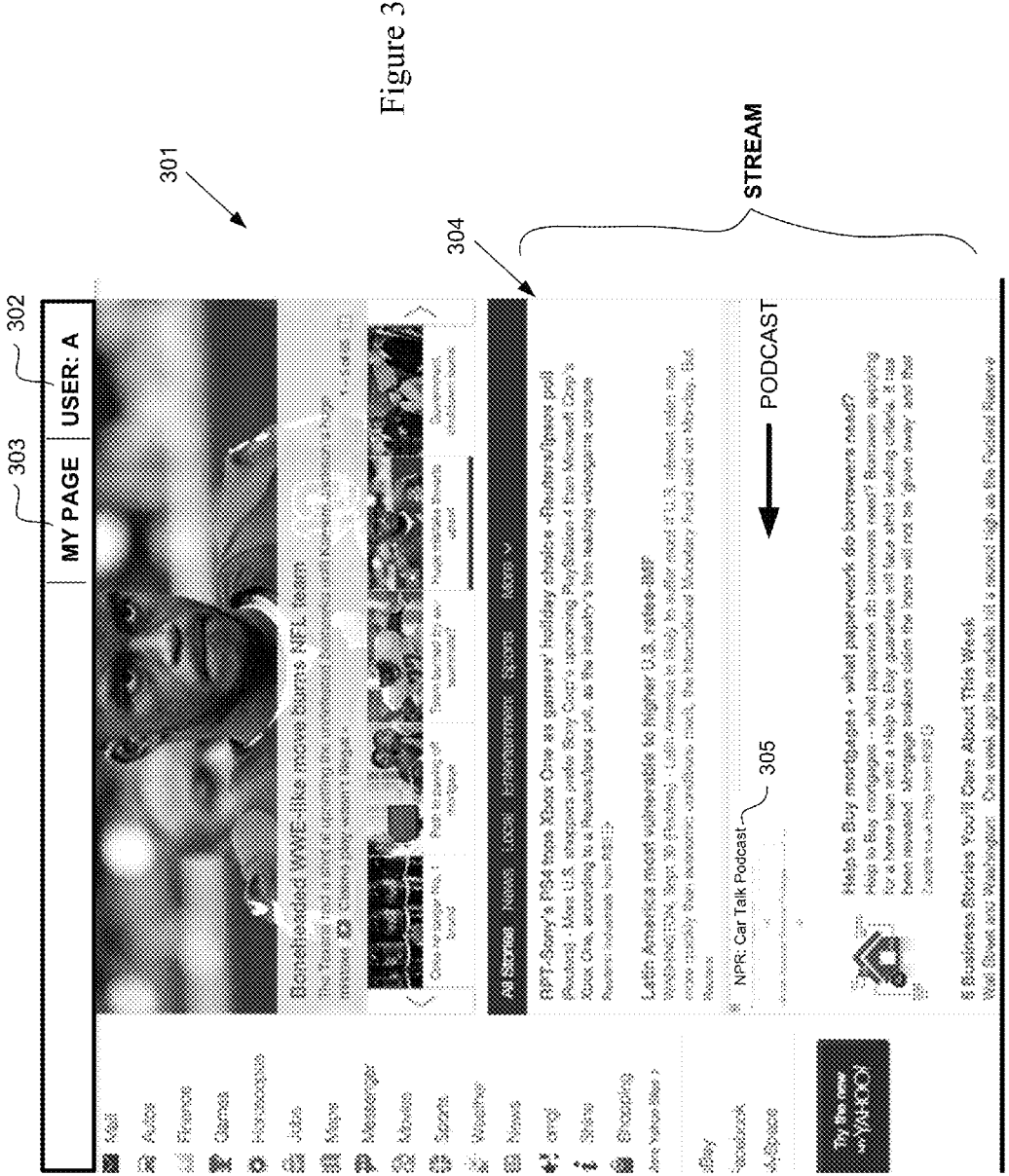
FIG. 3 is a webpage for a content-aggregation website serving a personalized content stream that includes a podcast, in accordance with an example embodiment.

FIG. 3 is a webpage for a content-aggregation website serving a personalized content stream that includes a podcast, in accordance with an example embodiment. Webpage 301 in this figure is a Yahoo! News webpage, which is a "stream" webpage, as opposed to the "wall" webpage. Webpage 301 includes a content stream 304 which is a scrollable stream of content items that is personalized for a user 302 (e.g., as identified through login authentication), e.g., based on implicit relevance feedback in the form of a viewing/listening history. In turn, scrollable content stream 304 includes a hypertext link 305 for a podcast, which might be added to content stream 304 using the processes described below. In the example shown in FIG. 3, the hypertext link 305 is for a podcast entitled "Car Talk" by National Public Radio (NPR). Webpage 301 also includes a hypertext link 303 to the user's "wall" webpage, e.g., MyYahoo!. It will be appreciated that "stream" webpages are relatively easier to view in smart devices with touch-screens than "wall" webpages since the former tend to be navigated with scrolling gestures and the latter tend to be navigated with pinching gestures.

Figure 4A:
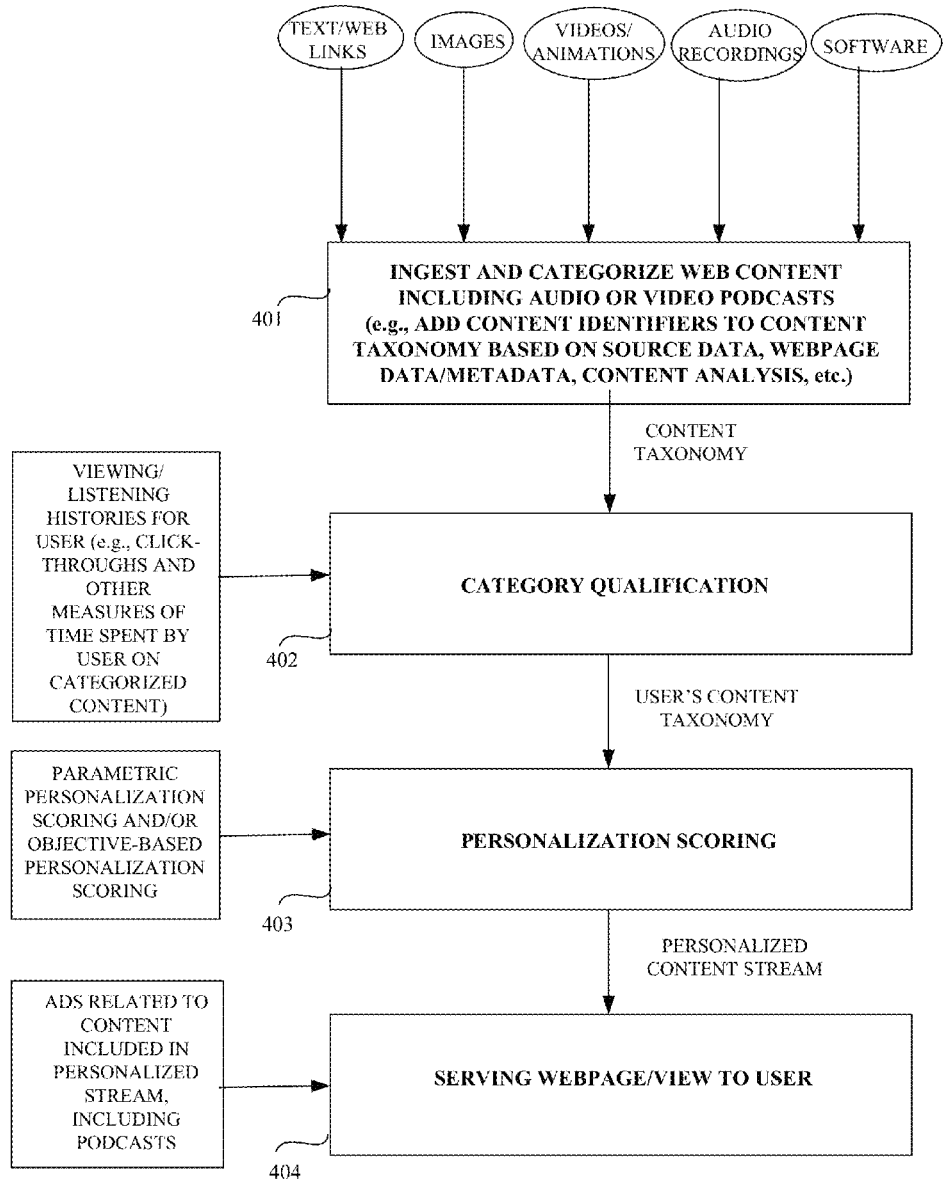
FIG. 4A is a sequence diagram showing a process for serving a personalized content stream that includes a podcast, in accordance with an example embodiment.

FIG. 4A is a sequence diagram showing a process for serving a personalized content stream that includes a podcast, in accordance with an example embodiment. In an example embodiment, the operations shown in this figure might be performed by software running on servers at website 104 using persistent storage 105. In an alternative example embodiment, some of the operations shown in this figure might be performed by software (e.g., a webpage with embedded JavaScript or ActionScript) running on a client device, e.g., personal computer 102 or mobile device 103.

As depicted in this figure, software on a content-aggregation website ingests content (e.g., using "push" and/or "pull" technology as described above) and adds the content to a content taxonomy based on data associated with the content, in operation 401. The content might include audio or video podcasts. In an example embodiment, the content taxonomy might have been generated at the content-aggregation website using automated or semi-automated operations. For example, the content taxonomy might have been generated using supervised classifiers or unsupervised classifiers. Also, in an example embodiment, the content taxonomy might be maintained as a "B+ tree" data structure whose non-leaf nodes are categories of content and whose leaf nodes are items of content (e.g., text including web links, images, videos, animations, audio recordings, games and other software, etc.) identified by identifiers in the content taxonomy and stored on the content-aggregation website or by a third-party content provider, including a CDN as described above. In alternative example embodiments, other hierarchical (parent-child) data structures might be used for the content taxonomy.

When adding a podcast to the content taxonomy in operation 401, the data associated with the podcast might include: (a) data associated with the source of the podcast, e.g., the entity publishing the podcast; (b) data and metadata associated with the webpages for the podcast; and/or (c) analysis of the podcast itself. For example, if the podcast is an audio podcast published by Car Talk, (a) might include the URL "www.cartalk.com", (b) might include the HTML text for the podcast's webpages and HTML meta tags such as "car repair" or "auto mechanic", and (c) might include audio analysis of the podcast's audio file, identifying terms such as "carburetor" and "transmission". In an example embodiment, the data associated with the podcast might then be matched to one or more content categories (e.g., non-leaf nodes) in the taxonomy, by calculating and applying a similarity measure. If the data associated with the podcast is a set of words or terms (e.g., keywords) and the content categories are a set of words/terms or are associated with a set of words/terms (e.g., keywords), the similarity measure might be Jaccard similarity, in an example embodiment. If the data associated with the podcast is a vector of words/terms (e.g., keywords) and the content categories are a vector of words/terms or are associated with a vector of words/terms (e.g., keywords), the similarity measure might be cosine similarity, in an example embodiment. The podcast might then be added as a leaf node to the content category if the calculated value of the similarity measure is greater than a specified value (or threshold).

In operation 402, the software qualifies a user of the website as to specific content categories (e.g., non-leaf nodes) in the content taxonomy, based on explicit and/or implicit relevance feedback from the user. Explicit relevance feedback might take the form of user input to a GUI dialog inquiring about the user's interests. Implicit relevance feedback might include the viewing/listening history of the user, e.g., click-throughs and/or other measures of time spent (e.g., time spent viewing, time spent listening, time spent playing, etc.) by the user on categorized content. For example, if a user clicks the web links for a sufficiently large (e.g., greater than a specified value, say, 7) number of stories (e.g., text and images) and videos about politicians in the "politics" content category, the user might be determined to be qualified as to that content category. One might think of the content categories as to which a user qualifies as a personalized content taxonomy for the user, as indicated in FIG. 4A. It will be appreciated that qualification for a content category might ordinarily precede personalization as described below, since it would be inefficient to generate a personalization score for content items (e.g., leaf nodes) in content categories as to which the user does not qualify.

In operation 403, the software calculates a personalization score for the specific content items (e.g., leaf nodes) in a user's personalized content taxonomy. In an example embodiment, the personalization score might be based on a simple heuristic such as counting the number of content items served to a user in a particular content category. So, for example, if a user is served over 5 articles on Barack Obama, a podcast on Barack Obama might receive a relatively high personalization score. Or, the personalization score for a content item might be based on a user's click-throughs and/or other measures of time spent (e.g., time spent viewing, time spent listening, time spent playing, etc.) on categorized content, as noted in the preceding paragraph.

In another example embodiment, the personalization score for a podcast might be the result of a parametric function with weighted (e.g., as a result of performing a regression) parameters that predicts the probability a user will listen or view a podcast. In this embodiment, the parametric function might include (a) parameters that (e.g., when weighted) increase the personalization score (or probability of listening or viewing a podcast) and (b) parameters that (e.g., when weighted) decrease the personalization score (or probability of listening or viewing a podcast). For example, parameters that increase the personalization score (or probability of listening or viewing a podcast) might include: (a) the number of click-throughs or a measure of the time spent viewing, listening, playing, etc., other content items (e.g., stories with text and images or videos) in the same content category; and (b) a count of the number of times the user has qualified for a specific content category. Parameters that decrease the personalization score (or probability of listening or viewing a podcast) might include fatigue factors such as: (a) the number of times the podcast has been served to the user; and (b) the number of times the user has been served other content items (e.g., stories with text and images or videos) from the same source (e.g., website) in the same content category.

In another example embodiment, the personalization score might be the result of objective-based personalization. Objectives that might be used when determining a personalization score are revenue, engagement, diversification, etc. Revenue sources for content-aggregation websites (such as Yahoo! News, Google News, Facebook, Twitter, etc.) include revenue from: (1) revenue sharing (e.g., from traffic acquisition costs or TAC paid by content publishers including podcasters), (2) click-based ads; (3) view-based (or display) ads; (3) search-based ads; (4) subscriptions; (5) deals; and (6) premium services. So if the content-aggregation website wants to increase revenue from revenue sharing and/or subscriptions, the content-aggregation website might assign a relatively high personalization score to a podcast that is a paid podcast. Similarly, if the objective is engagement rather than revenue, the content-aggregation website might also assign a relatively high score to a paid podcast since it can be served (e.g., using an audio or video file and a media player) from the content-aggregation website. By contrast, a free podcast might tend to decrease engagement since clicking on a hypertext link for the podcast takes the user away from the content-aggregation website. If the objective is content diversification, either a free podcast or a paid podcast might be used, if it has a relatively high probability of being listened to or viewed, in comparison to other podcasts in the same content category.

In another example embodiment, revenue per user might be correlated with the number of podcasts shown to the user to determine a relatively optimal number of podcasts to serve to the user, using machine-learning technology.

Furthermore, personalization scoring might include more than one of the above-described approaches. For example, parametric personalization might be combined with objective-based personalization to create a hybrid approach for personalization scoring.

In operation 404 in FIG. 4A, the software uses the personalization scores for the content items (e.g., leaf nodes) in the user's content taxonomy to determine which content items to serve to the user in a personalized content stream in a webpage (e.g., rendered by a browser) or in a view (e.g., rendered by an app on a mobile device). In an example embodiment, the personalized content stream might include a podcast. And as shown in FIG. 4A, an ad related to the podcast might be served to the user in the same webpage or view.

Figure 4B:
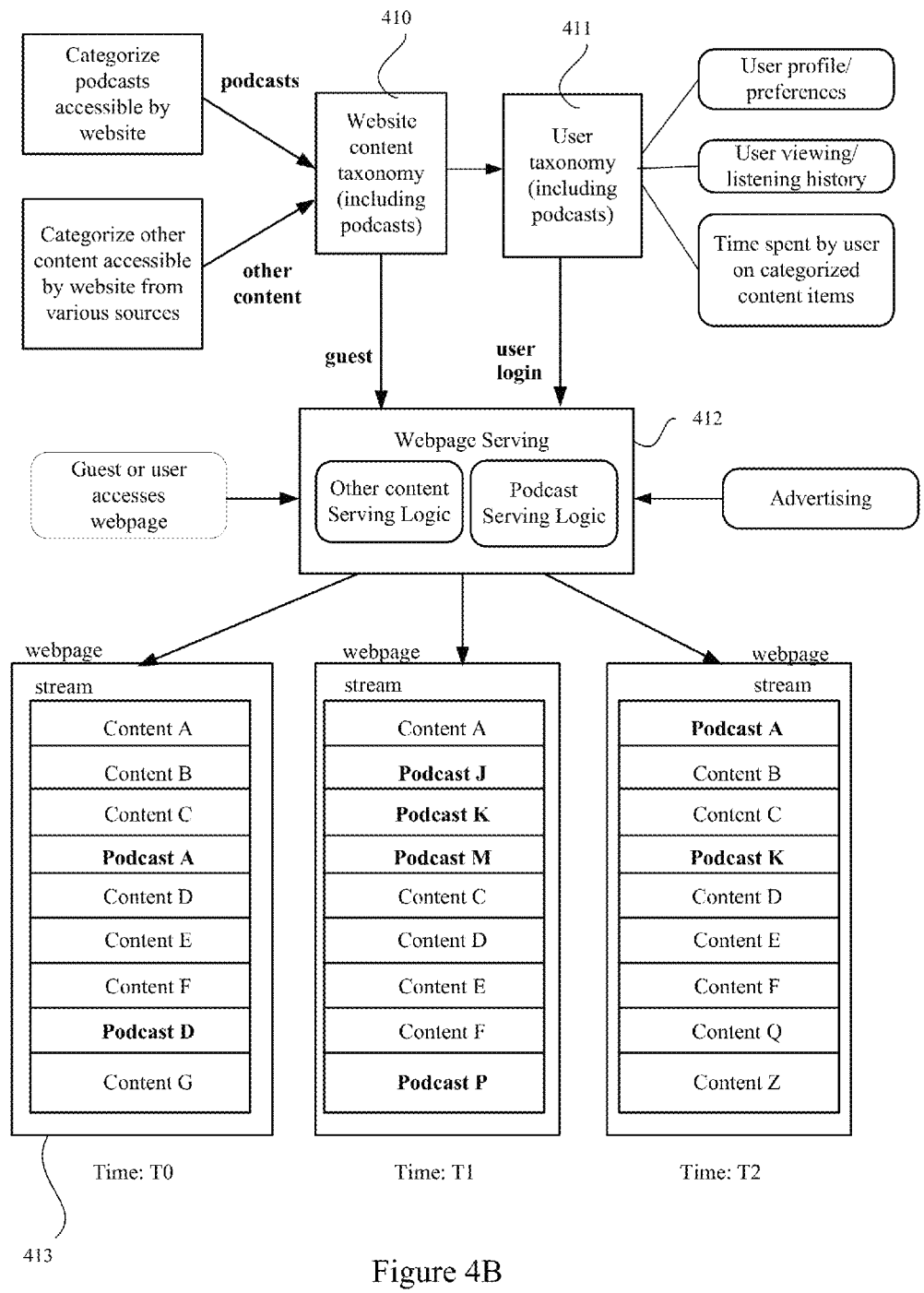
FIG. 4B is a diagram showing the generation of personalized and un-personalized content streams, in accordance with an example embodiment.

FIG. 4B is a diagram showing the generation of personalized and un-personalized content streams, in accordance with an example embodiment. It will be appreciated that FIG. 4B overlaps to some extent with FIG. 4A. As depicted in FIG. 4B, software at a website (e.g., a content-aggregation website such as Yahoo! News, Google News, Facebook, Twitter, etc.) ingests content, including podcasts, and uses it to generate a content taxonomy with items of content as leaf nodes and categories of content as non-leaf nodes, in operation 410. In operation 411, the software uses explicit relevance feedback (e.g., profile/preferences) for a user and implicit relevance feedback (e.g., viewing/listening history, time spent on categorized content items, etc.) for a user to qualify a user as to specific content categories in the content taxonomy and thereby create a user content taxonomy that is a subset of the content taxonomy. It will be appreciated that operation 411 might not be performed if the person accessing the website is a guest (e.g., a person who has not created an account/profile with the website), in an example embodiment. If that is the case, the software on the website might still create a guest content taxonomy that is a subset of the content taxonomy, e.g., based on data in web cookies, geo-location information (e.g., GPS data) received from the guest's client device (e.g., mobile device 103), the IP address for the guest's client device (e.g., personal computer 102 or mobile device 103), etc.

In operation 412, the software creates a content stream to serve a guest or user. If the content stream is for a guest, the software might apply an interestingness algorithm (e.g., similar to Facebook's EdgeRank algorithm or the interestingness algorithm described in co-owned U.S. Pat. No. 8,732,175 by Butterfield et al., entitled "Interestingness ranking of media objects") to create a ranking of the content items (e.g., leaf nodes) in the guest content taxonomy and then use this ranking to serve the content items (e.g., with the highest ranked content item at the top of the content stream) in a content stream in webpage 413, in an example embodiment.

If the content stream is for a user, the software might apply personalization scoring as described above with respect to FIG. 4A to create a ranking of the content items (e.g., leaf nodes) in the user content taxonomy and then use this ranking to serve the content items (e.g., with the highest ranked content item at the top of the content stream) in a personalized content stream in webpage 413, in an example embodiment. Or, if the content stream is for a user, the software might apply both personalization scoring and an interestingness algorithm to create a ranking of the content items (e.g., leaf nodes) in the user content taxonomy and then use this ranking to serve the content items (e.g., with the highest ranked content item at the top of the content stream) in a personalized content stream in webpage 413, in an example embodiment.

FIG. 4B also shows webpage 413 in a time series. At time T0 (e.g., the earliest point in time), the content stream in webpage 413 includes two podcasts, Podcast A and Podcast D. At time T1, these podcasts have been replaced by Podcast J, Podcast K, Podcast M, and Podcast P at different relative positions in the content stream, e.g., in response to implicit relevance feedback from the guest or user, as evidenced by click-throughs, mouse-overs, mouse-hovers, etc. Similarly, at time T2, Podcast J, Podcast K, Podcast M, and Podcast P have been replaced by Podcast A and Podcast K at different relative positions in the content stream, e.g., in response to implicit relevance feedback from the guest or user, as evidenced by click-throughs, mouse-overs, mouse-hovers, etc.

Figure 5:
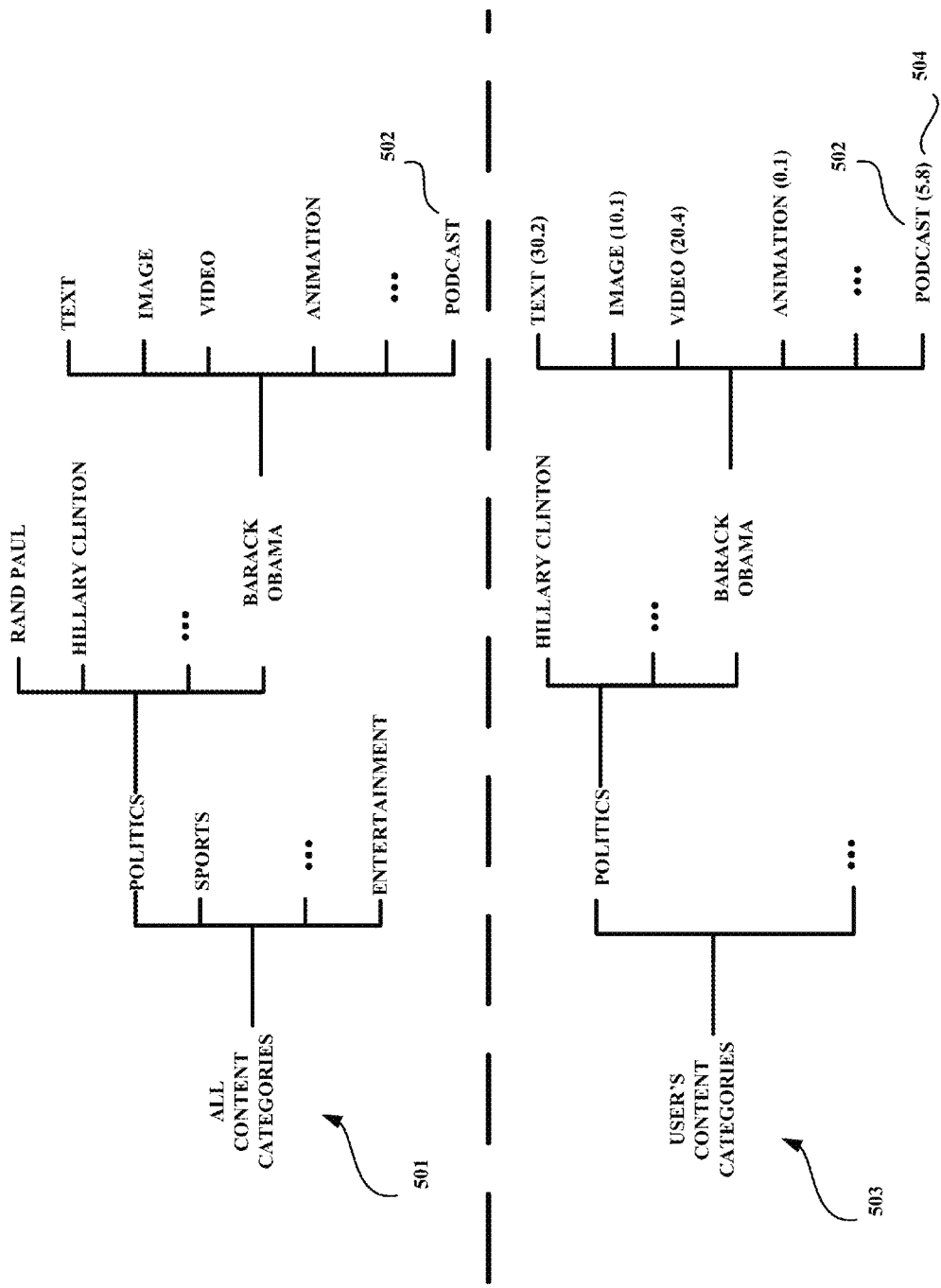
FIG. 5 depicts a content taxonomy and a user's content taxonomy that has personalization scores, in accordance with an example embodiment.

FIG. 5 depicts a content taxonomy and a user's content taxonomy with personalization scores, in accordance with an example embodiment. As depicted in this figure, content taxonomy 501 is a content taxonomy that might be generated by a content-aggregation website, using, e.g., operation 401 in FIG. 4 as described above. Content taxonomy 501 includes a leaf-node for a podcast 502 (or an identifier for podcast 502) that relates to Barack Obama. (The ellipsis in content taxonomy 501 indicates the existence of other nodes, both leaf and non-leaf) User content taxonomy 503 in FIG. 5 is a user content taxonomy with personalization scores that might be generated by a content-aggregation website, using, e.g., operations 402 and 403 in FIG. 4 as described above. User content taxonomy 503 includes podcast 502 (or an identifier for podcast 502), relating to Barack Obama, as well as a personalization score 504 for podcast 502. (Here again, the ellipsis in user content taxonomy 503 indicates the existence of other nodes, both leaf and non-leaf) It will be appreciated that user content taxonomy 503 and its personalization scores might be used as a basis for serving a personalized content stream to a user in a webpage/view, e.g., using operation 404 in FIG. 4. For example, such a personalized content stream might consist of all the content items for all leaf nodes in user content taxonomy 503 with a personalization score above a specified value (or threshold), presented in descending order according to personalization score, e.g., with the content item with the highest score at the top of the content stream and the content item with the lowest score at the bottom of the content stream. In an example embodiment, the order of content items in the personalized content stream might be re-ordered on the client device (e.g., personal computer 102 or mobile device 103) according to implicit relevance feedback (e.g., a mouse-over or mouse-hover), following initial display of the webpage/view.

Figure 6A:
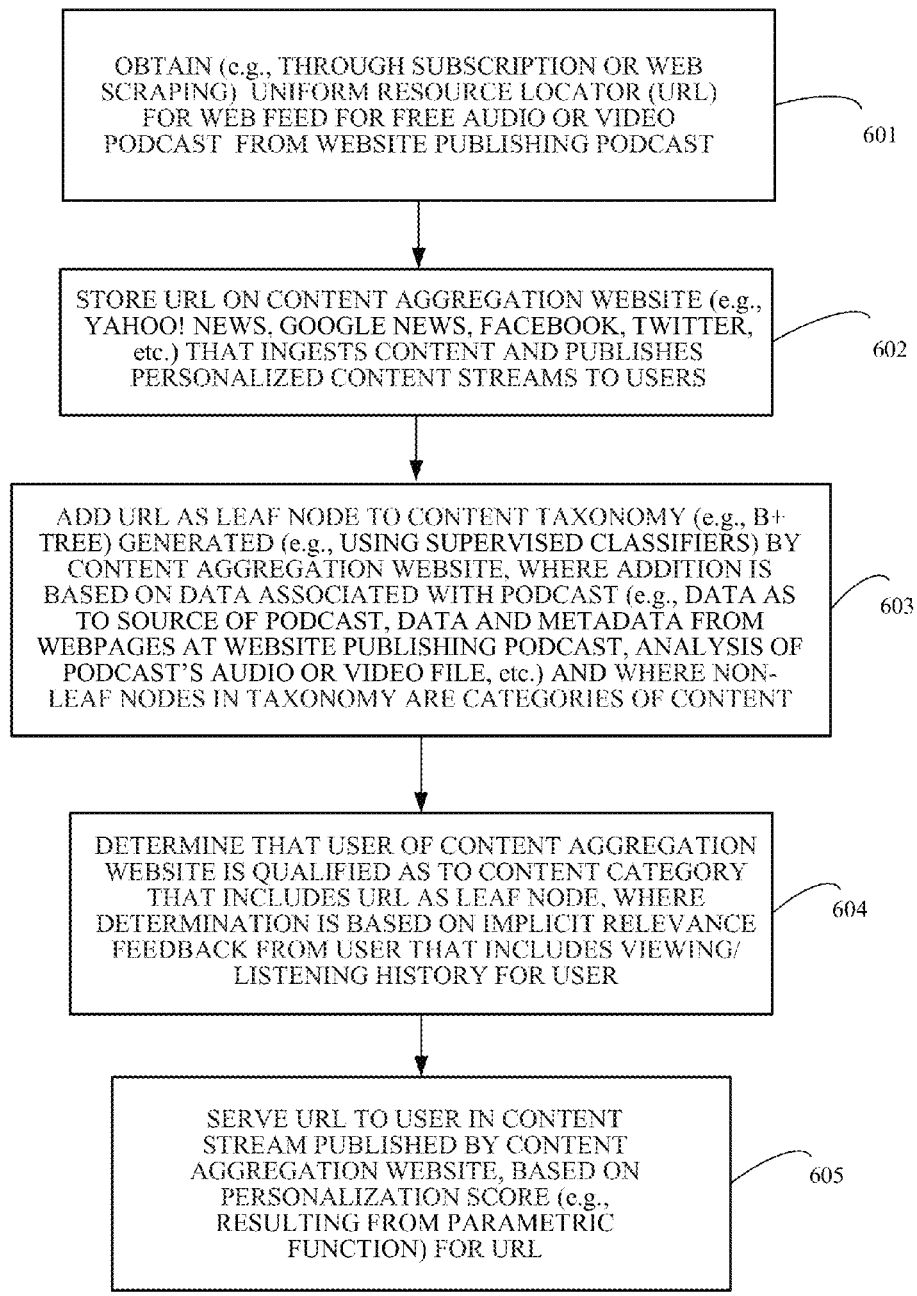
FIG. 6A is a flowchart diagram of a process for serving a personalized content stream that includes a uniform resource locator (URL) for a web feed for a free audio podcast, in accordance with an example embodiment.

FIG. 6A is a flowchart diagram of a process for serving a personalized content stream that includes a uniform resource locator (URL) for a web feed for a free audio or video podcast, in accordance with an example embodiment. In an example embodiment, the operations shown in this figure might be performed by software running on servers at content-aggregation website 104 (e.g., Yahoo! News, Google News, Facebook, Twitter, etc.) using persistent storage 105. In an alternative example embodiment, some of the operations shown in this figure might be performed by software (e.g., a webpage with embedded JavaScript or ActionScript) running on a client device (e.g., personal computer 102 or mobile device 103).

As depicted in FIG. 6A, the software obtains (e.g., through subscription or web scraping) a uniform resource locator (URL) for a web feed for a free audio or video podcast from the website publishing the podcast, in operation 601, and stores the URL on the content-aggregation website, in operation 602. In operation 603, the software adds the URL as a leaf node to a content taxonomy (e.g., B+ tree) generated (e.g., using supervised classifiers) by the content-aggregation website. The non-leaf nodes in the content taxonomy are content categories, as described above. In an example embodiment, the addition might be based on data associated with podcast (e.g., data as to the source of the podcast, data and metadata from the webpages at the website publishing the podcast, analysis of the podcast's audio or video file, etc.), as also described above.

In operation 604, the software determines that a user of the content-aggregation website is qualified as to a content category that includes the URL as a leaf node. In an example embodiment, the determination might be based on implicit relevance feedback from a user that includes a viewing/listening history for the user. Then in operation 605, the software serves the URL to the user in a content stream published by the content-aggregation website, based on personalization score for the URL, as described above.

Though the operations in FIG. 6A describe a URL for a web feed for a free audio or video podcast, they might be applied to a URL for a web feed for a paid audio or video podcast, in another example embodiment. Here it will be appreciated that use of a URL for a web feed for a free audio or video podcast might not implicate copyright laws and/or other intellectual-property laws and/or regulations, whereas the same might not be true of a URL for a web feed for a paid audio or video podcast.

Figure 6B:
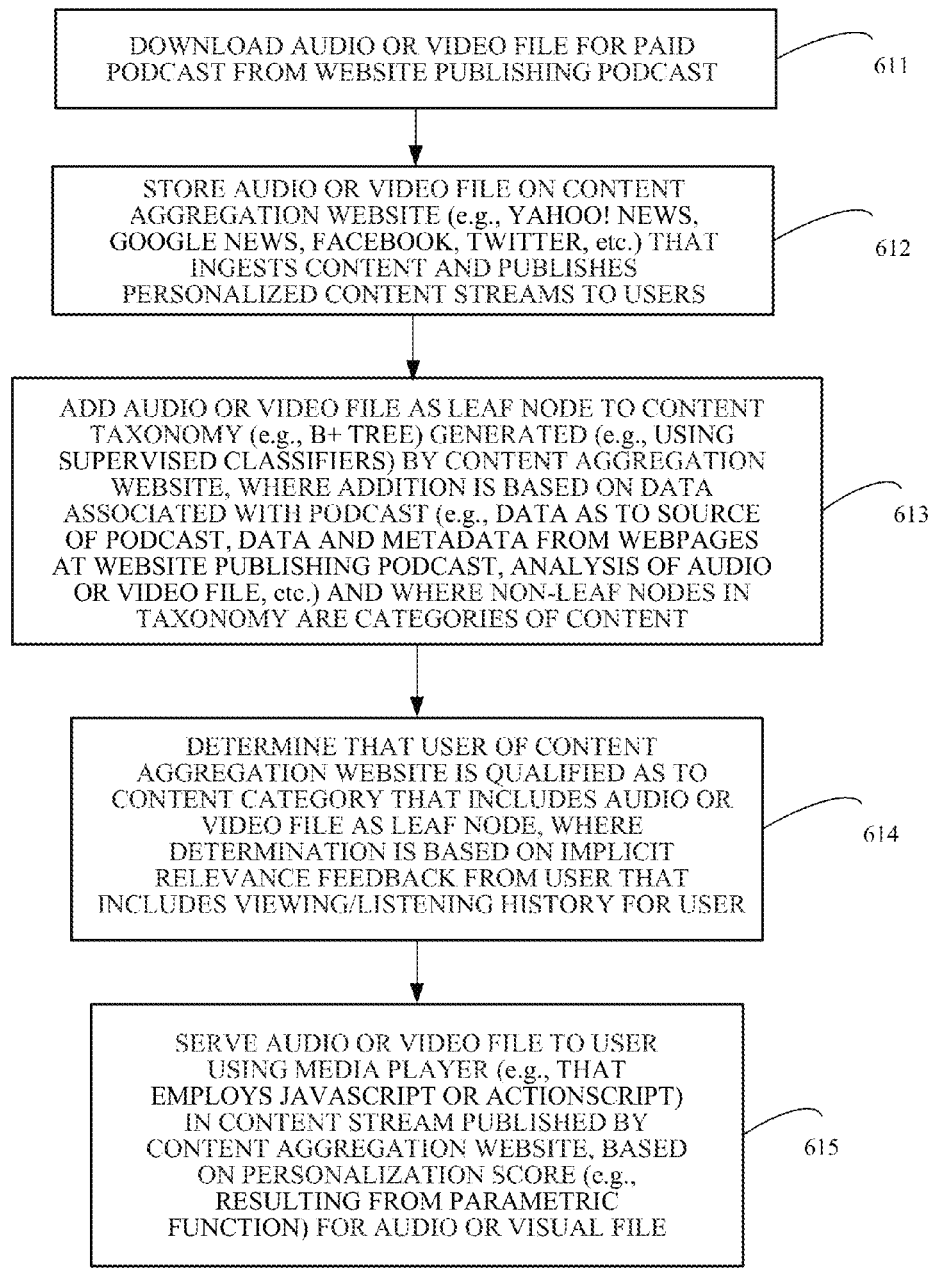
FIG. 6B is a flowchart diagram of a process for serving a personalized content stream that supports play of a downloaded paid audio podcast, in accordance with an example embodiment.

FIG. 6B is a flowchart diagram of a process for serving a personalized content stream that supports play of a downloaded paid audio or video podcast, in accordance with an example embodiment. In an example embodiment, the operations shown in this figure might be performed by software running on servers at content-aggregation website 104 (e.g., Yahoo! News, Google News, Facebook, Twitter, etc.) using persistent storage 105. In an alternative example embodiment, some of the operations shown in this figure might be performed by software (e.g., a webpage with embedded JavaScript or ActionScript) running on a client device, e.g., personal computer 102 or mobile device 103.

As depicted in FIG. 6B, the software downloads an audio or video file for a paid podcast from the website publishing the podcast, in operation 611, and stores the audio or video file on the content-aggregation website, in operation 612. In operation 613, the software adds the audio or video file as a leaf node to a content taxonomy (e.g., B+ tree) generated (e.g., using supervised classifiers) by the content-aggregation website. The non-leaf nodes in the content taxonomy are content categories, as described above. In an example embodiment, the addition might be based on data associated with the podcast (e.g., data as to the source of the podcast, data and metadata from the webpages at the website publishing podcast, analysis of the audio or video file, etc.), as also described above.

In operation 614, the software determines that a user of the content-aggregation website is qualified as to a content category that includes the audio or video file as a leaf node. In an example embodiment, the determination might be based on implicit relevance feedback from a user that includes a viewing/listening history for the user. Then in operation 615, the software serves the audio or video file to the user using a media player (e.g., that employs JavaScript or ActionScript) in a content stream published by content-aggregation website, based on a personalization score for the audio or video file, as described above.

Though the operations in FIG. 6A describe an audio or video file for a paid podcast, they might be applied to an audio or video file for a free podcast, in another example embodiment.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the file for the podcast might be a PDF or some other file format, rather than an audio or video file as used for descriptive purposes above. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising operations of:
   obtaining a resource associated with a podcast from a first website publishing the podcast;
   storing the resource on a second website that ingests content;
   adding the resource as a leaf node to a taxonomy generated by the second website, wherein the addition is based at least in part on data associated with the podcast and a similarity measure that is cosine similarity or Jaccard similarity and wherein non-leaf nodes in the taxonomy are categories of content;
   determining that a user of the second website is qualified as to at least one category that includes the resource as a leaf node, wherein the determination is based at least in part on feedback from the user that includes one or more of a viewing history for the user or a listening history for the user; and
   serving the resource to the user in a content stream published by the second website, based at least in part on a personalization score associated with the resource, wherein each of the operations are executed by one or more processors.

2. The method of claim 1, wherein the resource is an audio or video file and the podcast is a paid podcast.

3. The method of claim 1, wherein the resource is a uniform resource locator (URL) for a web feed and the podcast is a free podcast.

4. The method of claim 1, wherein the determination that the user of the second website is qualified as to at least one category is based at least in part on implicit relevance feedback from the user.

5. The method of claim 1, wherein the data associated with the podcast includes data associated with the source of the podcast.

6. The method of claim 1, wherein the data associated with the podcast includes data or metadata from the web pages of the first website.

7. The method of claim 1, wherein addition of the resource as a leaf to the taxonomy includes analyzing an audio or video file associated with the resource.

8. The method of claim 1, wherein the taxonomy is generated by the second website using supervised classifiers.

9. The method of claim 1, wherein the personalization score is based at least in part on a parametric function that includes a measure of user fatigue as a parameter.

10. The method of claim 1, wherein the personalization score results at least in part from an analysis of revenue.

11. One or more computer-readable media that are non-transitory and store instructions that, when executed by a processor, perform the following operations:
   obtain a resource associated with a podcast from a first website publishing the podcast;
   store the resource on a second website that ingests content;
   add the resource as a leaf node to a taxonomy generated by the second website, wherein the addition is based at least in part on data associated with the podcast and a similarity measure re that is cosine similarity or Jaccard similarity and wherein non-leaf nodes in the taxonomy are categories of content;
   determine that a user of the second website is qualified as to at least one category that includes the resource as a leaf node, wherein the determination is based at least in part on feedback from the user that includes one or more of a viewing history for the user or a listening history for the user; and
   serve the resource to the user in a content stream published by the second website, based at least in part on a personalization score associated with the resource.

12. The computer-readable media of claim 11, wherein the resource is an audio or video file and the podcast is a paid podcast.

13. The computer-readable media of claim 11, wherein the resource is a uniform resource locator (URL) for a web feed and the podcast is a free podcast.

14. The computer-readable media of claim 11, wherein the determination that the user of the second website is qualified as to at least one category is based at least in part on implicit relevance feedback from the user.

15. The computer-readable media of claim 11, wherein the data associated with the podcast includes data associated with the source of the podcast.

16. The computer-readable media of claim 11, wherein the data associated with the podcast includes data or metadata from the web pages of the first website.

17. The computer-readable media of claim 11, wherein addition of the resource as a leaf to the taxonomy includes analyzing an audio or video file associated with the resource.

18. The computer-readable media of claim 11, wherein the taxonomy is generated by the second website using supervised classifiers.

19. The computer-readable media of claim 11, wherein the personalization score is based at least in part on a parametric function that includes a measure of user fatigue as a parameter.

20. A method, comprising operations of:
   obtaining a resource associated with a podcast from a first website publishing the podcast;
   storing the resource on a second website that ingests content;
   adding the resource as a leaf node to a taxonomy generated by the second website, wherein the addition is based at least in part on data associated with the podcast and a similarity measure that is cosine similarity or Jaccard similarity, wherein non-leaf nodes in the taxonomy are categories of content based at least in part on data associated with the podcast, wherein the taxonomy can be represented as a B+ tree, and wherein the taxonomy is generated by the second website using supervised classifiers;
   determining that a user of the second website is qualified as to at least one category that includes the resource as a leaf node, wherein the determination is based at least in part on feedback from the user that includes one or more of a viewing history for the user or a listening history for the user; and
   serving the resource to the user in a content stream published by the second website, based at least in part on a personalization score associated with the resource, wherein each of the operations are executed by one or more processors.

\* \* \* \* \*